Dec. 19, 1967  K. HEYDLAUF ET AL  3,358,520
ADJUSTABLE SHEAVE
Filed Dec. 20, 1965

INVENTOR

ATTORNEY

United States Patent Office 3,358,520
Patented Dec. 19, 1967

3,358,520
ADJUSTABLE SHEAVE
Kurt Heydlauf, Stuttgart-Zuffenhausen, and Herbert Braun, Bissingen (Enz), Germany, assignors to Ernst Heinkel Aktiengesellschaft, Stuttgart-Zuffenhausen, Germany
Filed Dec. 20, 1965, Ser. No. 515,518
Claims priority, application Germany, Dec. 24, 1964, H 54,689
11 Claims. (Cl. 74—230.17)

ABSTRACT OF THE DISCLOSURE

An adjustable sheave, comprising a shaft member and a flange mounted on the shaft member. A second, movable flange member is arranged on the shaft member with freedom of axial movement relative thereto and is provided with a hub surrounding a portion of the shaft member coaxially therewith. A plurality of motion-transmitting members are at least partially received and longitudinally slidable in axially extending complementary grooves provided in the outer surface of the shaft member and the inner surface of the hub to couple the movable flange member to the shaft member with freedom of axial movement while preventing relative rotation of the members in response to transmission of torque from one to the other thereof.

---

The present invention relates to a sheave. More specifically, the invention relates to an adjustable sheave. Still more specifically, the invention relates to a novel coupling means for coupling the movable flange of an adjustable sheave to a shaft member thereof.

In continuously variable drive arrangements utilizing V-belts, the belt passes around a sheave arranged on a shaft from which or to which power is to be transmitted. Such sheaves must be adjustable to permit continuous power variation. They comprise two flanges of which one is fixed with the shaft while the other is axially movable thereon. These flanges together define a V-shaped groove in which the V-belt is received. Continuous variation of the drive arrangement is achieved by moving the movable flange away from the fixed flange to a greater or lesser degree, whereby the V-belt is supported by the opposed surfaces of the two flanges of the sheave at a greater or lesser distance from the shaft. To prevent rotation of the movable flange, while permitting axial movement of the same, it is customary to provide a key which engages both in an axial groove on the shaft and a similar groove on the inner surface of the hub of the movable flange. This arrangement might ordinarily be satisfactory for the relatively large axial adjusting movements of the movable flange when power is to be varied, were it not for the continual small axial movements which are caused not by an adjustment in the position of the movable flange in order to vary the transmission of power but rather by the fact that the width of the V-belt varies slightly from point to point thereof. As a result of this, the movable one of the flanges constantly performs small axial movements which, however, because of their great frequency cause damage to the groove in which the coupling key is received. Thus, an arrangement of this type will rather quickly be subject to so much damage that it will no longer function properly.

Attempts have been made to provide several such keys in angularly spaced relationship distributed about the periphery of the shaft, but it has been found that this is not satisfactory either, since it does not result in an equal distribution of stress on all of the keys. One key will always be subjected to a greater amount of stress than the others and it will be this key where damage will again occur rather quickly. Particularly this latter arrangement has the additional disadvantage that it develops considerable noise, which can be very bothersome to the machine operators, even before the device becomes inoperative as the result of the damage which the noise merely serves to announce.

It is therefore an object of the present invention to overcome the drawbacks of the above-described prior-art construction.

A more specific object of the present invention is to provide an adjustable sheave in which torque stresses will be distributed as equally as possible to a plurality of coupling members.

A further object of the invention is to provide an adjustable sheave of the type described which is relatively resistant to wear, particularly to wear resulting from continual axial motions of the movable flange caused by width-variations of an associated V-belt.

A concomitant object of the invention is to provide an adjustable sheave which is simple to construct, requires no precision machining of the coupling arrangement which couples the movable flange with the shaft, and which can be readily and quickly assembled.

Yet a further object of the invention is to provide such an adjustable sheave which, even when wear does occur, will not develop an objectionable level of noise during operation of a transmission employing such sheave.

In accordance with one feature of our invention we provide an adjustable sheave which comprises a shaft member and a fixed flange mounted on the shaft member. There is further provided a movable flange member arranged on the shaft member and provided with a hub, and coupling means which includes a plurality of motion-transmitting members. These motion-transmitting members are at least partially received in axially extending complementary grooves provided in the outer surface of the shaft member and the inner surface of the hub and thus couple the movable flange member to the shaft member with freedom of axial movement relative thereto, while at the same time preventing relative rotation of the members upon transmission of torque from one to the other of the members.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings in which:

Figure 1:
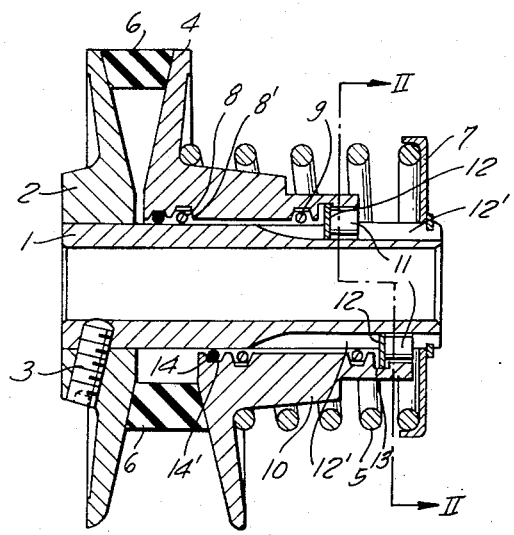
FIG. 1 is an axial sectional view through an adjustable sheave constructed in accordance with the invention, the movable flange member being shown in the upper half of the view in one position, and in the lower half of the view in another position in which it is axially displaced with respect to the position shown in the upper half of the view.

Discussing now the drawing in detail, and firstly FIG. 1 thereof, it will be seen that there is shown therein a shaft 1, which in the illustrated embodiment is hollow, and on which there is fixedly secured a stationary flange 2 by means of a screw 8 which passes through a portion of the flange 2 and engages in a suitable bore provided in the wall of shaft 1. A movable flange 4 is arranged adjacent to the fixed flange 2 and is axially movable on the shaft 1. It is clearly evident from the upper half of FIG. 1 how the two flanges 2 and 4 together form a V-shaped groove in which a V-belt 6 is received. In the lower half of FIG. 1 the movable flange 4 is shown displaced to the right in axial direction of the shaft, and the V-belt 6 is more deeply received in the V-groove defined between the flanges 2 and 4 since this groove now has become wider as a result of the axial movement of flange 4.

Flange 4 is biased in the direction towards the fixed flange 2 by a suitable biasing means, such as a coil spring 5, which with one of its ends abuts the movable flange 4 and with its other end abuts a stop means, such as an annular member or ring 7 secured on the shaft 1.

It has already been pointed out earlier that the width of the V-belt 6 is not constant at all points of the belt, and naturally this results in small but constant axial movements of the movable flange 4 as the same yields to the wider parts of the belt. Flange 4 is provided with a hub 10 and to overcome the friction generated by the small axial movements of movable flange 4 there are provided wire bearing rings 8, 9 which are received in circumferential recesses 8′, 9′ provided in the inner surface of the hub 10. These wire ring bearings engage the outer surface of the shaft 1 and, upon small axial movements of the movable flange 4, perform a rolling motion as a result of being twisted in themselves by the axially directed force generated during such small movements. Of course, when the adjustable flange 4 undergoes larger axial movements, that is such movements as are necessary to displace it from the position shown in the upper half of FIG. 1 into the position shown in the lower half of FIG. 1, for instance, then the bearing rings 8, 9 will simply slide along the peripheral outer surface of the shaft 1.

Figure 2:
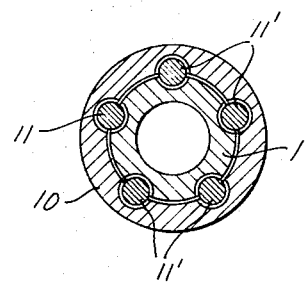
FIG. 2 is a section taken on the line II—II of FIG. 1.

To permit axial movement of the movable flange 4 along the shaft 1, while preventing rotational movement relative to the shaft 1, and to enable relatively even distribution of torque stresses about the entire periphery of the shaft 1, the latter is provided with concave axially extending grooves 11′. Similar grooves 11′, but complementary to those in the outer peripheral surface of the shaft 1, are provided in the inner surface of the hub 10 of movable flange 4. Received in every pair of such complementary grooves 11′ is a coupling member, such as a cylindrical motion-transmitting member 11. This is best seen in FIGS. 1 and 2, and the cylindrical shape of the members is most clearly evident in FIG. 3. Advantageously, the motion-transmitting members 11 are made from rubber or another elastomeric material, for example a material which is commercially avaiable under the name "Vulkullan" in particular, have been found to slide very readily in the complementary grooves 11′, and at the same time have a high degree of resistance to destruction by the unavoidable friction. The motion-transmitting members 11 will advantageously be angularly spaced about the outer surface of the shaft 1 so that torque stresses are distributed as evenly as possible to the individual members 11. Of course, one of the members 11 will still be subject to greater stress than the others; however, the use of elastomeric material for construction of the members 11 mitigates the undesirable effects of this to some extent and at the same time reduces considerably the noise level when the amount of wear exceeds a predetermined limit at which in ordinary constructions the noise level becomes unacceptable.

Since the members 11 are simply cylindrical in shape, and do not require precision-machined grooves, as is the case with T-shaped or otherwise configurated keys of prior-art constructions, both the manufacture and the assembly of the novel sheave are very much facilitated and are therefore also much cheaper.

This is particularly true, incidentally, if the hub 10 surrounds the shaft 1 with a sight clearance, as is indicated in FIG. 1 of the drawing in the present case. Such an embodiment is particularly advantageous, not only from the point of view of manufacturing tolerances, or rather the elimination thereof, but also because the motion-transmitting members 11 will then serve to center the hub and thereby the movable flange 4 with respect to the shaft 1. This centering is of course automatic upon insertion of the motion-transmitting members 11 into the corresponding grooves 11′, and requires no special arrangements.

Figure 3:
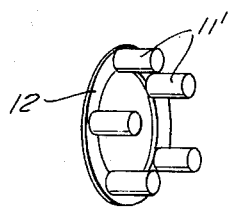
FIG. 3 shows an embodiment of the coupling means in accordance with the present invention.

As will be seen from FIG. 3, the motion-transmitting members 11 are advantageously secured to an annular carrier, such as a ring 12, which is received in an annular recess 12′ provided in the inner surface of the hub 10. By this arrangement the motion-transmitting members 11 are prevented from axial displacement when the flange 4 moves in axial direction of the shaft 1. The ring 12 also serves as a seal, as does a further annular gasket or sealing ring 14 which is provided for the same purpose at the end of the hub 10 which is opposite the ring 12.

It should be noted that the novel sheave described herein is particularly suitable for use in applications where relatively low torque is to be transmitted although its range of application is by no means limited to this.

It will be understood that each of the elements described above, or two or more together, may also find a useful application in other types of adjustable sheaves differing from the types described above.

While the invention has been illustrated and described as embodied in an adjustable sheave, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An adustable sheave, comprising a shaft member; a flange mounted on said shaft member; a movable flange member arranged on said shaft member with freedom of axial movement relative thereto and provided with a hub surrounding a portion of said shaft member coaxially therewith; and coupling means, including a plurality of motion-transmitting members at least partially received and longitudinal slidable in axially extending complementary grooves provided in the outer surface of said shaft member and the inner surface of said hub to couple said movable flange member to said shaft member with freedom of axial movement relative thereto while preventing relative rotation of said members in response to transmission of torque from one to the other thereof.

2. A sheave as defined in claim 1, wherein said motion-transmitting members are cylindrical and said grooves are of concave cross section.

3. A sheave as defined in claim 1, wherein said motion-transmitting members are cylindrical and said grooves of concave cross section, and wherein said motion-transmitting members and the corresponding grooves are angularly spaced about said shaft.

4. A sheave as defined in claim 3, wherein said hub surrounds said shaft member with clearance, and wherein the motion-transmitting members received in said grooves center said hub with respect to said shaft member.

5. A sheave as defined in claim 4, and further comprising carrier means secured to one end of at least some of said cylindrical motion-transmitting members and connected to said flange member, whereby said carrier means and motion-transmitting members secured thereto are movable with said flange member.

6. A sheave as defined as claim 5, wherein said carrier means is an annular member, and wherein said inner surface of said hub of said movable flange member is provided with a circumferential recess, said annular member being at least partially received therewithin and thereby being connected to said flange member.

7. A sheave as defined in claim 6, wherein said flange is fixed; and further comprising biasing means axially biasing said movable flange member in the direction towards said fixed flange, said movable flange member and said fixed flange defining between themselves a V-groove adapted to receive a V-belt.

8. A sheave as defined in claim 7, wherein said biasing means comprises stop means secured to said shaft member on a side of said movable flange member which faces away from said fixed flange, and spring means interposed between said movable flange member and said stop means and bearing on both, so as to bias said movable flange member towards said fixed flange.

9. An adjustable sheave, comprising a shaft member; a fixed flange mounted on said shaft member; a movable flange member arranged on said shaft member and defining with said fixed flange a V-groove adapted to receive a V-belt, said movable flange member having a hub provided with an inner surface surrounding a portion of said shaft member coaxially and with clearance; coupling means centering said hub with respect to said shaft member and coupling said movable flange member thereto with freedom of axial movement while preventing relative rotation of said members in response to transmission of torque from one to the other thereof, said coupling means including an annular carrier member at least partially received in a circumferential recess provided in said inner surface, and a plurality of cylindrical motion-transmitting members secured to said annular carrier member and being at least partially received in a corresponding plurality of angularly spaced axially extending passages each consisting of a pair of complementary concave grooves respectively provided in an outer surface of said shaft member and said inner surface of said hub; biasing means biasing said movable flange member toward said fixed flange and comprising stop means secured to said shaft member on a side of said movable flange member which faces away from said fixed flange, and spring means interposed between said movable flange member and said stop means and bearing on both; and wire bearing means encircling said shaft member within said hub and arranged to perform rolling movements with respect to said shaft member during relatively small axial shifts of said movable flange member, and sliding movements during larger shifts of the same.

10. A sheave as defined in claim 9, and further comprising sealing means interposed between said outer surface of said shaft member and said inner surface of said hub in sealing engagement with both of said surfaces.

11. An adjustable sheave, comprising a shaft member; a fixed flange mounted on said shaft member; a movable flange member arranged on said shaft member and having a hub provided with an inner surface coaxially surrounding a portion of said shaft member; coupling means coupling said movable flange member to said shaft member with freedom of axial movement relative thereto while preventing relative rotation of said members in response to transmission of torque from one to the other thereof; biasing means biasing said movable flange member toward said fixed flange; and wire bearing means encircling said shaft member within said hub and arranged to perform rolling movements with respect to said shaft member during relatively small axial shifts of said movable flange member, and sliding movements during larger shifts of the same.

References Cited

UNITED STATES PATENTS

| | | | |
|---|---|---|---|
| 2,564,826 | 8/1951 | Yoder | 64—27 |
| 2,776,575 | 1/1957 | Michie | 74—230.17 |
| 2,834,220 | 5/1958 | Kingdom | 74—230.17 |
| 2,505,120 | 4/1950 | Jackson | 64—27 X |
| 3,180,164 | 4/1965 | Chung | 74—230.17 |
| 3,237,471 | 3/1966 | Wunsch | 74—230.17 |

FRED C. MATTERN, Jr., *Primary Examiner.*

C. J. HUSAR, *Assistant Examiner.*